United States Patent [19]

Gorsek

[11] Patent Number: 4,926,172

[45] Date of Patent: May 15, 1990

[54] JOYSTICK CONTROLLER

[75] Inventor: Edmund J. Gorsek, Springfield, Ill.

[73] Assignee: Dickey-john Corporation, Auburn, Ill.

[21] Appl. No.: 241,027

[22] Filed: Sep. 2, 1988

[51] Int. Cl.$^5$ .......................................... H01H 36/00
[52] U.S. Cl. ..................................... 341/20; 200/5 A; 200/6 A; 74/473 R; 273/148 B; 335/2
[58] Field of Search ................... 341/20, 22; 340/709, 340/706; 200/5 A, 6 A, 335; 74/471 XY, 476, 473 R; 273/148 B; 178/18–20; 338/128, 32 H; 324/207, 208, 251; 250/221; 335/2, 106–107, 159–162, 168, 170, 177

[56] References Cited

U.S. PATENT DOCUMENTS

| | | | |
|---|---|---|---|
| 3,585,319 | 6/1971 | Payerle | 200/6 A |
| 3,770,915 | 11/1973 | Bennett | 200/6 A |
| 3,814,871 | 6/1974 | Osika | 200/6 A |
| 3,824,354 | 7/1974 | Anderson | 200/1 R |
| 3,898,397 | 8/1975 | Devore | 200/6 A |
| 3,927,285 | 12/1975 | Frost | 200/6 A |
| 4,026,048 | 5/1977 | Hill | 37/42 R |
| 4,181,827 | 1/1980 | Diepeveen | 200/6 A |
| 4,244,122 | 1/1981 | Hetrick | 37/41 |
| 4,297,542 | 10/1981 | Shunway | 200/6 A |
| 4,353,177 | 10/1982 | Hoekstra | 37/234 |
| 4,601,179 | 9/1986 | Parker | 74/335 |
| 4,607,159 | 8/1986 | Goodson et al. | 74/471 XY |
| 4,782,327 | 11/1988 | Kley et al. | 341/20 |
| 4,794,388 | 12/1988 | Matthews | 340/709 |

OTHER PUBLICATIONS

"'Fly-by-wire' Techniques harnessed to gearbox control'", Engineering Materials and Design, Oct. 1987 issue.

*Primary Examiner*—Parshotam S. Lall
*Assistant Examiner*—Tyrone Queen
*Attorney, Agent, or Firm*—Richard Bushnell

[57] ABSTRACT

A joystick controller apparatus comprises a lever mounted for pivotal motion in at least two directions, a guide defining a preselected shift pattern for the lever, and an indicating arrangement for producing a digital logic representation of the position of the lever relative to the shift pattern. The indicating arrangement comprises energy actuated members positioned at predetermined locations relative to the shift pattern, energy producing members positioned in registry with the energy actuated members for normally actuating the same and shield members interposed between the energy producing members and energy actuated members and movable in response to movement of the lever into positions for respectively permitting and preventing actuation of the energy actuated members by the energy producing members in a predetermined fashion such that said energy actuated members collectively form a representation of the location of the lever relative to the shift pattern.

8 Claims, 2 Drawing Sheets

JOYSTICK CONTROLLER

BACKGROUND OF THE INVENTION

The present invention is directed generally to apparatus for representing a plurality of positions of an element in digital logic form and more particularly to such an apparatus adapted for use with a joystick-type of shift lever arrangement for providing a digital logic representation of the position of a shift lever relative to a given shift pattern.

Joystick-type control levers are utilized in many applications, including relatively simple video game devices, as well as relatively more demanding machinery control applications. Such control applications may include the control of industrial machinery and/or gear shift levers for both off-road and on-road vehicles.

In such industrial and vehicular applications, the shift levers must be very rugged and reliable in operation over a relatively long service life. These relatively rugged assemblies must continue to operate reliably in spite of adverse environmental conditions which might be encountered, whether it be on the factory floor, or in on-road or off-road vehicular applications.

In particular, in mechanized farm equipment, such joystick-type of shift or other control levers must operate in a hostile environment. In the agricultural applications, this generally includes use in vehicles such as tractors and harvesters which transverse fields during plating, cultivation, fertilizing and harvesting operations. In these operations, considerable dirt, dust and the like is encountered in the field or even created by operation the machinery itself. Moreover, various pesticides, herbicides and fertilizer materials can be corrosive and/or abrasive, causing premature wear and failure of both mechanical and electrical or electronic components of such control systems.

In this latter regard, the assignee of the present application has also developed a number of novel electronic and/or microcomputer-based control systems for various agricultural or other on-road and off-road vehicles and/or other machinery applications. Accordingly, it is also desirable to provide a joystick controller which is capable of simply and readily interfacing with existing control systems to provide an easy-to-use digital logic representation of the position of the shift lever with respect to a given shift pattern.

OBJECTS AND SUMMARY OF THE INVENTION

Accordingly, it is a general object of this invention to provide a novel and improved joystick controller which provides a digital logic representation of the position of a joystick lever relative to a shift pattern.

Briefly, and in accordance with the foregoing objects, a joystick controller apparatus in accordance with the invention comprises a lever; mounting means for mounting said lever for pivotal motion in at least two directions; guide means defining a preselected shift pattern for said lever; and indicating means for producing a digital logic representation of the position of said lever relative to said shift pattern; said indicating means comprising energy actuated means positioned at predetermined locations relative to the shift pattern, energy producing means positioned in registry with the energy actuated means for normally actuating the same, and shield means interposed between the energy producing means and energy actuated means and movable in response to movement of said lever into positions for respectively permitting and preventing actuation of the energy actuated means by the energy producing means in a predetermined fashion such that said energy actuated means collectively form a representation of the location of said lever relative to said shift pattern.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

DETAILED DESCRIPTION OF THE ILLUSTRATED EMBODIMENT

Figure 1:
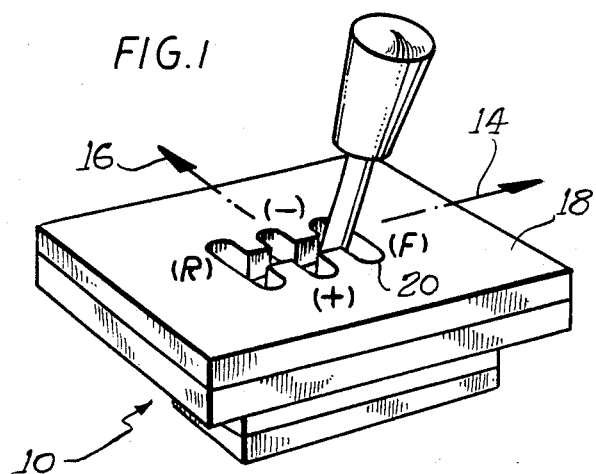
FIG. 1 is a simplified perspective view of a joystick controller apparatus in accordance with the invention.
Figure 3:
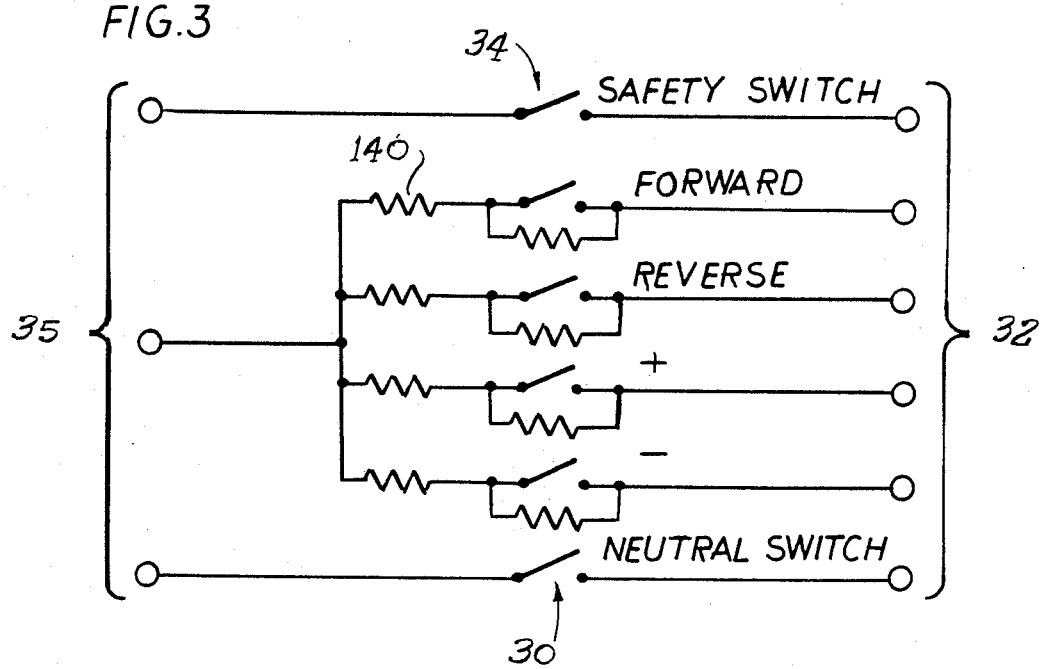
FIG. 3 is a circuit schematic diagram illustrating a preferred form of electrical circuit for connection with the joystick controller apparatus of the invention.

Referring now to the drawings, and initially to FIGS. 1 and 3, a joystick controller in accordance with the invention is indicated generally by reference numeral 10. Generally speaking, this joystick controller includes a joystick or lever 12 which is movable in at least two orthogonal directions 14, 16. Cooperatively, a guide plate or guide means 18 defines a preselected shift pattern 20 which in turn defines a number of discrete possible positions of movement of the joystick with respect to the orthogonal axes or directions 14, 16. The illustrated shift pattern is generally a double-H configuration defining essentially nine positions for shift lever 12. However, other shift patterns may be utilized without departing from the invention, the illustrated pattern being by way of illustration only.

In accordance with the invention, a position indicating means 30, shown in circuit schematic form in FIG. 3, is adapted to respond to the position of the lever 12 relative to the shift pattern 20 for producing a digital logic representation of this position. In the embodiment illustrated in FIG. 3, this digital logic representation comprises a composite electrical signal produced on a series of output terminals 32 in response to a given pattern of actuated and non-actuated switches, designated generally by reference numeral 34. That is, these switches or other similar switching means 34 are arranged in such a manner as to be actuated or non-actuated in predetermined sequences or patterns, so as to provide a plurality of distinct sequences or patterns representative of the plurality of possible positions of the lever 12 relative to the shift pattern 20. Respective input terminals 35 of the switches may be coupled to any convenient reference voltage.

Referring next to FIG. 3, in the illustrated embodiment, the position indicating means takes the form of a plurality of energy actuated means, such as a magnetically actuated reed switch 40. Only one such reed switch 40 has been illustrated for purposes of description, it being understood that a plurality of such switches 40, corresponding in number to the switches 34 illustrated schematically in FIG. 3, are utilized in the illustrated embodiment. These energy actuated means or switches 40 are positioned at predetermined locations relative to the shift pattern 20. In the illustrated embodiment, this is accomplished by providing a switch mounting block member 42 which is formed with a plurality of recesses or cavities designated generally by reference numeral 44 at predetermined locations thereon relative to the shift pattern 20. Each of these cavities 44 is of complementary shape for mounting therewithin one of the reed switches or other energy actuated means 40.

Cooperatively, the position indicating means utilizes a plurality of energy producing means such as magnets 50 which are, like the switches 40 mounted or positioned at predetermined locations relative to the shift pattern. In the illustrated embodiment, a magnet mounting block 52 is similarly provided with a plurality of recesses or cavities 54 each being of complimentary configuration for receiving and mounting one of the magnets 50, it being understood that although only one of the magnets 50 has been illustrated herein, one such magnet 50 is provided in each cavity 54. Moreover, the cavities 54, and hence the magnets 50, are aligned in a predetermined pattern relative to the cavities or recesses 44 and reed switches or other energy actuated devices 40, such that the energy producing means 50 would normally actuate the energy actuated means 40.

It will be understood that other forms of energy producing means and energy actuated means, e.g., one or more light sources and phototransistors, might be employed without departing from the invention.

However, a further shield member or shield means, which here takes the form of a pair of metallic plate-like shield members 60, 62 is interposed between the energy producing means and energy actuated means. These shield means are located and configured for movement into respective positions for alternatively permitting or preventing the actuation of the latter by the former. These shield means or members 60, 62 are generally coupled or otherwise mounted for movement in response to movement of the lever 12 in a predetermined fashion to cause the aforesaid movement of the shields between positions for respectively preventing and permitting actuation of the various ones of switches 40 by the associated magnets 50.

Figure 2:
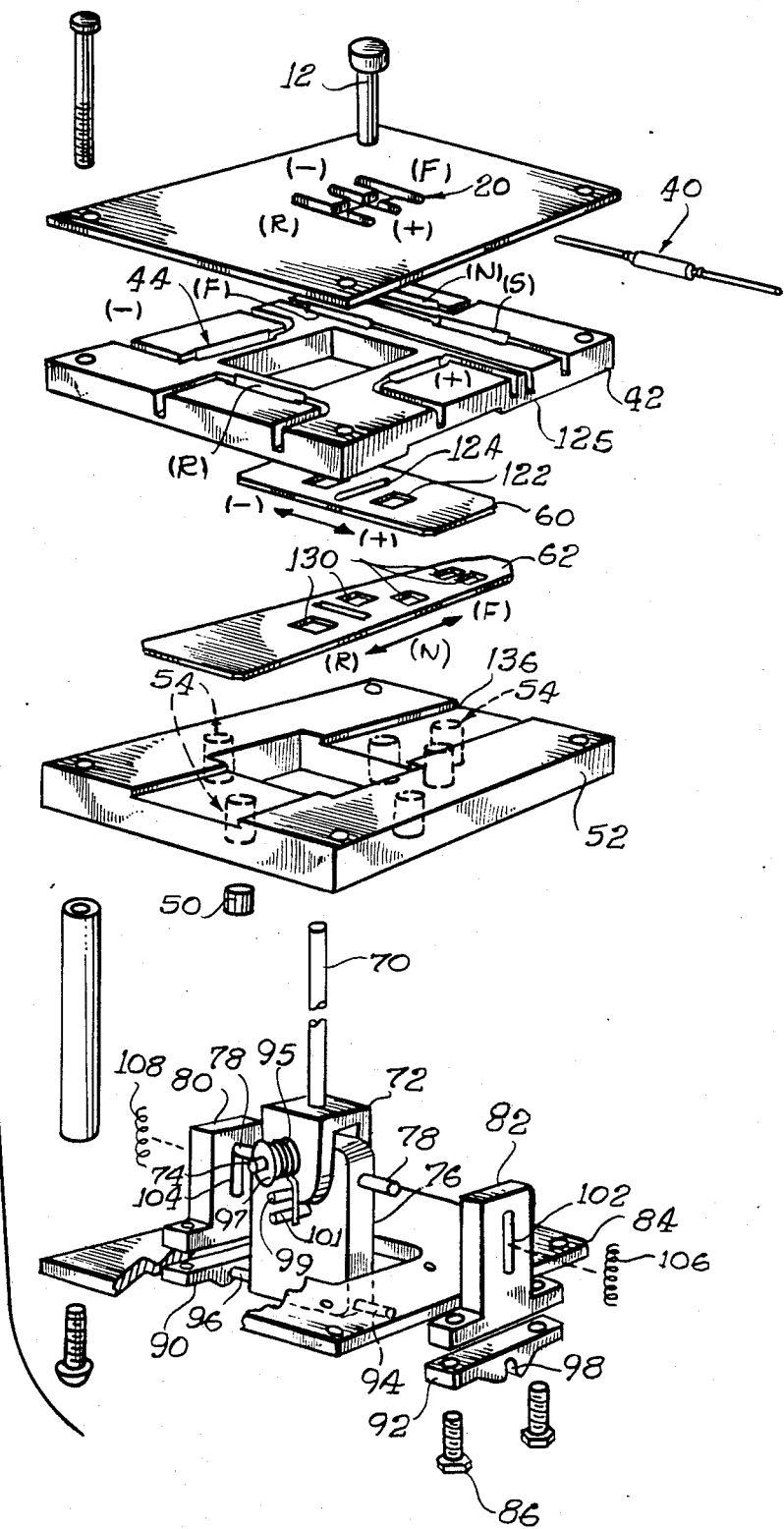
FIG. 2 is an exploded perspective view illustrating the details of the joystick assembly of FIG. 1.

From the foregoing, and referring again briefly to FIG. 3, it will be seen that the switches or other energy actuated means 40 generally correspond to the switches indicated in the schematic diagram of FIG. 3. Referring briefly to FIGS. 2 and 3 together, the switches are here designated at forward (F), reverse (R), + and −, which are located at generally north, south, east and west locations relative to the plane defined by guide plate 18 and the orthogonal directions of movement 14, 16 indicated in FIG. 1. Additionally, a neutral switch (N) and a safety switch (S) are provided.

The foregoing designations are applied to the respective switch-receiving cavities 44 in FIG. 2 and also to the respective switches illustrated in schematic circuit form in FIG. 3. These designations are for purposes of establishing some simple means of identification herein and are by no means to be considered as limiting the invention in any way. Like designations of forward (F), reverse (R), + and − are also indicated as being applied to the shift pattern in the illustrated embodiment, and these positions will be seen to correspond generally to the like-designated switch positions. The purpose of the additional respective neutral (N) and safety (S) switches will be more fully explained hereinbelow.

Referring now in further detail to FIG. 2, it will be seen that the shift lever or joystick 12 is mounted to an elongate shaft 70, which shaft is in turn pivotally mounted for pivotal motion in two orthogonal directions. A first generally U-shaped yoke-like member 72 is pivotally mounted by a pivot pin 74 which extends through a block 76. The block 76 is in turn mounted for pivotal motion about an axis defined by a transverse pivot pin or shaft 78. This latter shaft 78 extends at right angles to shaft 74 and is received in a pair of end mounting blocks 80, 82. These latter mounting blocks 80 and 82 are preferably mounted to a base plate 84 by suitable means such as threaded fasteners 86 (only one pair illustrated).

In the illustrated embodiment, the pivotal motion of the block 76 is limited by a pair of detenting indexing blocks 90, 92 which are mounted to the plate 84 preferably using the same fasteners 86 as the respective blocks 80, 82. These latter indexing blocks have central detent slots or recesses for normally receiving a second set of outwardly extending locking pins or shaft members 94, 96 which are generally spaced from and parallel with the shaft 78.

In order to release the latter locking pins 94, 96 from engagement with the central detent slots or recesses (e.g., 98 with respect to member 92). The shaft 78 is mounted to the respective blocks 80, 82 in a spring-loaded arrangement. This arrangement includes a pair of elongate generally vertically extending mounting slots 102, 104 in the respective mounting blocks 80, 82, each of which mounts a coil compression spring 106, 108 which bears against an underside of one of the respective ends of shaft 78. Accordingly, the lower locking pins 94, 96 may be released from the detent slots to permit pivotal motion of the block 76 about the axis of shaft 78 by downward pressure upon the shift lever 12 and hence of shaft 78 against the opposing force of the respective compression springs 106, 108. The respective locking members 90, 92 have ramp-like surfaces leading up to their central detenting recesses to accommodate and guide the movement of pins 94, 96 as the block 76 pivots about the axis of shaft 78.

In order to return the shift lever to its upright position, a further torsion spring 95 is provided, in the preferred embodiment. The torsion spring 95 is wound around a spool-like member 97 extending from the side of yoke 72. Opposite free ends of torsion spring 95 abut respective pins 99, 101 which extend respectively from yoke 72 and block 76.

With respect to the shield members 60, 62, it will be seen that each is provided with a plurality of through apertures which correspond in a predetermined fashion to the arrangement of the respective magnets 50 and switches 40. The plate 60 is designated generally as the +, − member and has a pair of through apertures 120, 122 which are generally alignable with the respective + and − recesses 44 and hence with the switches 40 to be mounted therein. This shield 60 is a relatively thin, flat plate-like member and has an elongate centrally located slot 124 for receiving the shaft 70 therethrough.

A complementary shaped recess 125 is formed for receiving the plate 60 on the underside of the switch mounting plate or block 42, such that the plate 60 may slide in the + and − direction as indicated by the arrow in FIG. 2 but is restrained from movement in the forward (F) and reverse (R) directions, as indicated adjacent shield or plate member 62. It will be seen that the alignment of slot 124 will permit free movement of the shaft 70 relative to the plate in the forward and reverse direction and cause the plate 60 to move in unison with the shaft 70 as the latter is moved in the + and − direction.

The second shield member 62 is a similar relatively thin, flat plate-like member having a plurality of through apertures designated generally by reference numeral 130 which are respectively aligned for alternatively shielding and exposing respective ones of the switches 40 with respect to their associated magnets 50. This plate includes an elongate slot 134 for receiving shaft 70 therethrough and a complementary spaced recess 136 is provided in the magnet mounting block 52 for slidably receiving the shield or plate member 62 therewithin. Accordingly, the shield or plate member is free to slide in the forward (F) and reverse (R) directions as indicated in the associated arrows in FIG. 2 but is restrained from moving in the + and − directions. Similarly, the shaft 70 is free to move in the + and − directions relative to the plate or shield 62, but carries the plate or shield 62 with it as it is moved in the forward (F) and reverse (R) directions Referring briefly to Tables I and II hereinbelow, a logic diagram of the type of logic produced in the circuit of FIG. 3 is shown for the embodiment illustrated herein. However, it will be appreciated that other logic schemes may be utilized without departing from the invention, the following Tables being included for purposes for illustration of a preferred embodiment.

In the preferred embodiment illustrated herein, all of the switches 40 are normally open switches which are activated in a predetermined sequence or pattern to define the joystick positions. The forward switch will activate as the joystick is moved to the forward (F) position and will stay continuously in its active or closed state as the joystick is moved in either the + or − positions while remaining in the forward position (F/+ and F/−). The neutral switch will be activated as the joystick is moved to the central or neutral position and will remain closed as the joystick is moved toward either the + or − positions (N/+ and N/−). Similarly, the reverse switch will activate as the joystick is moved to the reverse position and will stay in the closed state as the joystick is moved toward the R/+ or R/− positions.

The + switch will activate as the joystick is moved to the + position and will be in the closed state whenever the joystick is in any of the F/+, N/+, or R/+ positions. The − switch will activate at any time the joystick is moved to any of the negative positions F/−, N/− and R/−. The safety switch is generally placed such that it is activated while the joystick is in transition between either of the forward and reverse positions and the neutral position or vice-versa. The safety switch may be utilized as an additional interlock feature to prevent actuation of any associated transmission or other device being controlled by the joystick until the joystick is fully moved from one position to another. The neutral switch may also be additionally used as a start up indicator or control if desired.

Referring briefly again to FIG. 3, it will be seen that the forward, reverse, + and − switches are each provided with a pair of resistor elements, one in series with the switch and one in parallel with the switch. These resistor elements, for example 140, 142 with respect to the forward switch are used in the illustrated embodiment to provide a series of readable voltages at the output end 32, which voltages will be indicative of the state of the respective switches. For example, with the forward switch in the open position as illustrated, terminal at 32 will "see" the sum of the resistances of resistors 140 and 142, which if placed in series with some further input impedance or resistor from terminal 32 to ground, for example will produce a first, predicable voltage drop when the values of all of the resistors are known. On the other hand when the forward switch is closed, the resistor 142 is shorted out of the circuit and a different resistance 140 appears at the terminal 32 and hence a different voltage drop will appear across an input impedance or resistance. In the same manner, in the event of short circuit or open circuit type of failure condition at the terminal 32, neither of the above expected voltage levels will be present, and this may be taken as an indication of failure in the circuit or wiring leading up to terminal 32.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended clam is to cover all such changes and modifications as fall within the true spirit and scope of the invention.

TABLE I

| POSITION | F | R | − | + | N/S | SS |
|---|---|---|---|---|---|---|
| 1 | 1 | 0 | 1 | 0 | 0 | 1 |
| 2 | 1 | 0 | 0 | 0 | 0 | 1 |
| 3 | 1 | 0 | 0 | 1 | 0 | 1 |
| 4 | 0 | 0 | 1 | 0 | 0 | 1 |
| 5 | 0 | 0 | 0 | 0 | 0 | 1 |
| 6 | 0 | 0 | 0 | 1 | 0 | 1 |
| 7 | 0 | 0 | 1 | 0 | 0 | 0 |
| 8 | 0 | 0 | 0 | 0 | 0 | 0 |
| 9 | 0 | 0 | 0 | 1 | 0 | 0 |
| 10 | 0 | 0 | 1 | 0 | 1 | 0 |
| 11 | 0 | 0 | 0 | 0 | 1 | 0 |
| 12 | 0 | 0 | 0 | 1 | 1 | 0 |
| 13 | 0 | 0 | 1 | 0 | 0 | 0 |
| 14 | 0 | 0 | 0 | 0 | 0 | 0 |
| 15 | 0 | 0 | 0 | 1 | 0 | 0 |
| 16 | 0 | 0 | 1 | 0 | 0 | 1 |
| 17 | 0 | 0 | 0 | 0 | 0 | 1 |
| 18 | 0 | 0 | 0 | 1 | 0 | 1 |
| 19 | 0 | 1 | 1 | 0 | 0 | 1 |
| 20 | 0 | 1 | 0 | 0 | 0 | 1 |
| 21 | 0 | 1 | 0 | 1 | 0 | 1 |

1 = Closed Switch
0 = Open Switch
F = Forward
R = Reverse
N/S = Neutral/Start
SS = Safety Switch
− = Downshift
+ = Upshift

TABLE II

| | 1 | 2 | 3 |
|---|---|---|---|
| Safety Switch | F/− | F | F/+ |
| | 4 | 5 | 6 |
| | (−) | | (+) |
| Dead Band | 7 | 8 | 9 |
| N/S | 10 | 11 | 12 |

TABLE II-continued

|  | (−) | N/S | (+) |
|---|---|---|---|
| Dead Band | 13 | 14 | 15 |
| Safety | 16 | 17 | 18 |
| Switch | (−) |  | (+) |
|  | R/− | R | R/+ |
|  | 19 | 20 | 21 |

The invention is claimed as follows:

1. A joystick controller apparatus comprising: a lever, pivot means for journaling said lever for pivotal motion in two orthogonal directions; position indicating means responsive to the position of said lever for producing a digital logic representation of said position; said position indicating means comprising a plurality of energy actuated means positioned at predetermined locations relative to said lever, energy producing means positioned at locations relative to said energy actuated means for actuating the same, and shield means located for movement into positions interposed between said energy producing means and said energy actuated means for preventing actuation of the latter by the former; said shield means being coupled for movement in response to movement of said lever in a predetermined fashion for causing the shield means to be moved between positions for respectively preventing and permitting actuation of said energy actuated means in a predetermined pattern corresponding to the position of said lever such that a given combination of actuated ones and nonactuated ones of said energy actuated means defines a digital logical representation corresponding to the position of said lever; wherein said shield means comprises a pair of plates interposed between said energy producing means and said energy actuated means, each of said plates including a plurality of through apertures arranged in a predetermined pattern for actuating said energy actuated means in a pattern corresponding to the position of said lever; and mounting block means for respectively mounting said energy actuated means and said energy producing means and having orthogonally aligned recesses for mounting said pair of plates for a slidable movement in orthogonal directions so as to align said apertures for actuating said energy actuated means in said pattern corresponding to said lever position and for confining each said plate to movement in but one of said orthogonal directions; said plates further including motion limiting slots for receiving said shift lever therethrough to define limits of motion thereof and correspondingly limiting the motion of each of said plates to assure said alignment of said apertures with said energy actuated means and with said energy producing means at said limits of motion of said shift lever.

2. Apparatus according to claim 1 and further including guide means defining a preselected shift pattern for said lever; and wherein said energy actuated means comprise magnetically actuated switch means and said energy producing means comprise magnet means.

3. Apparatus according to claim 2 wherein said shield means comprises a metallic plate interposed between said magnet means and said switch means.

4. Apparatus according to claim 2 wherein said shield means comprises a pair of metallic plates interposed between said magnet means and said switch means and respectively mounted for movement in two orthogonal directions unison with said lever.

5. Apparatus according to claim 4 wherein each of said metallic plates includes a plurality of through apertures arranged in a predetermined pattern for actuating said switch means in a pattern corresponding to the position of said lever relative to said shift pattern.

6. Apparatus according to claim 2 wherein said shift pattern lies in a single plane, such that the directions of movement of said lever define a pair of orthogonal axes in said plane of the shift pattern, and wherein said switch means include at least four switches, respectively mounted at north, south, east and west locations with respect to said orthogonal axes defined in said shift pattern by said lever.

7. Apparatus according to claim 6 wherein said switch means further include a neutral switch located for actuation when said shift lever is in a neutral position in the shift pattern.

8. Apparatus according to claim 7 wherein said switch means further include a safety switch located for actuation during movement of said lever both to said neutral position from at least one preselected other position in said shift pattern and also from said neutral position to said at least one preselected other position said shift pattern.

* * * * *